(12) United States Patent
Kobayashi et al.

(10) Patent No.: US 7,815,828 B2
(45) Date of Patent: Oct. 19, 2010

(54) INFLUENCE OF EACH OF THE PARAMETERS ON THE FOAMED PRODUCT STRENGTH

(75) Inventors: Toshiro Kobayashi, Nara (JP); Tsuneo Doi, Nara (JP); Hideki Kobayashi, Koga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 837 days.

(21) Appl. No.: 10/571,913

(22) PCT Filed: Sep. 8, 2004

(86) PCT No.: PCT/JP2004/013062

§ 371 (c)(1),
(2), (4) Date: Mar. 14, 2006

(87) PCT Pub. No.: WO2005/028173

PCT Pub. Date: Mar. 31, 2005

(65) Prior Publication Data

US 2006/0273482 A1      Dec. 7, 2006

(30) Foreign Application Priority Data

Sep. 17, 2003    (JP) .............................. 2003-324550

(51) Int. Cl.
*B29B 9/06*    (2006.01)
(52) U.S. Cl. ............... 264/142; 264/211.13; 264/211.2; 425/67
(58) Field of Classification Search ................. 425/67; 264/211.13, 211.2, 142
See application file for complete search history.

(56) References Cited

U.S. PATENT DOCUMENTS 3,857,665 A * 12/1974 Kennedy ................. 425/378.1

(Continued)

FOREIGN PATENT DOCUMENTS

EP         305862 A1 *  3/1989

(Continued)

OTHER PUBLICATIONS

Japanese Office Action dated May 22, 2008 for corresponding Japanese Application No. 2005-514021.

(Continued)

*Primary Examiner*—Philip C Tucker
*Assistant Examiner*—Alison Hindenlang
(74) *Attorney, Agent, or Firm*—Rader, Fishman & Grauer PLLC

(57) ABSTRACT

A method for manufacturing thermoplastic resin expandable granules comprising the steps of: injecting a blowing agent under pressure into a thermoplastic resin which is melted in an extruder; extruding the melted resin containing the blowing agent as an extrudate from a plurality of small holes in a die attached to a distal end of the extruder directly into a coolant liquid, and directly cutting the extrudate by high-speed rotary blades; and cooling and solidifying the extrudate by contacting with the coolant liquid, and thereby obtaining the expandable granules wherein the melted resin containing the blowing agent passing through land parts of the small holes of the die is extruded such that a shearing speed is 12,000 to 35,000 $sec^{-1}$, and an apparent melt viscosity of the resin is 100 to 700 poise.

11 Claims, 6 Drawing Sheets

U.S. PATENT DOCUMENTS

| | | | |
|---|---|---|---|
| 3,867,082 A | | 2/1975 | Lambertus |
| 4,385,016 A | * | 5/1983 | Gwinn .................... 264/37.26 |
| 5,911,928 A | | 6/1999 | Shimazu et al. |
| 6,315,931 B1 | * | 11/2001 | Bruning et al. ............... 264/53 |
| 6,884,377 B1 | * | 4/2005 | Burnham et al. .............. 264/50 |
| 7,294,299 B2 | * | 11/2007 | Yamanaka et al. .......... 264/142 |
| 2005/0156344 A1 | * | 7/2005 | Dietzen et al. ................ 264/51 |

FOREIGN PATENT DOCUMENTS

| | | |
|---|---|---|
| JP | 48-20423 | 6/1973 |
| JP | 49-69775 | 7/1974 |
| JP | 61-195808 | 8/1986 |
| JP | 06-031726 | 2/1994 |
| JP | 06-134753 | 5/1994 |
| JP | 06-136176 | 5/1994 |
| JP | 07-178726 | 7/1995 |
| JP | 07-314438 | 12/1996 |
| JP | 9-208735 | 8/1997 |
| JP | 11-058374 | 3/1999 |
| JP | 11-277528 A | 10/1999 |
| JP | 2001-253965 | 9/2001 |
| JP | 2002-337138 | 11/2002 |
| JP | 2003-220606 | 8/2003 |
| WO | WO-03/053651 A1 | 7/2003 |
| WO | WO 03106544 A2 * | 12/2003 |

OTHER PUBLICATIONS

Supplementary European Search Report issued Sep. 9, 2009 for corresponding European Application No. 04 78 7745.

* cited by examiner

RELATIONSHIP BETWEEN RESIN MELT VISCOSITY AND STRENGTH

RANGE OF APPARENT MELT VISCOSITY IN THE PRESENT INVENTION 100~700

RELATIONSHIP BETWEEN SHEAR SPEED AND STRENGTH

RANGE OF SHEARING SPEED IN THE PRESENT INVENTION 12000~35000

INFLUENCE OF EACH OF THE PARAMETERS ON THE FOAMED PRODUCT STRENGTH

TECHNICAL FIELD

The present invention relates to a method for manufacturing thermoplastic resin expandable granules.

Priority is claimed on Japanese Patent Application No. 2003-324550, filed Sep. 17, 2003, the contents of which are incorporated herein by reference.

BACKGROUND ART OF INVENTION

Generally, a method for impregnating a blowing agent into resin granules that are obtained by suspension polymerization is widely adopted as a method for manufacturing thermoplastic resin expandable granules. However, this method has a problem in that a waste water disposal plant is required for disposing a large quantity of waste water containing a suspension stabilizer, a surface active agent, and a polymerization initiator or the like since the polymerization is carried out in a water medium. Furthermore, the method has a problem in that the yield of expandable granules having a predetermined granule size is low because the granules obtained by the method vary in size.

As a method for solving these problems, a manufacturing method called an extrusion process, in which a resin melted and mulled in an extruder is extruded from a die that is fitted to the end of the extruder so that the resin is cut into granules, is known.

The extrusion process is classified into two types according to the timing of cutting the resin into granules. One is a method called a hot-cut method, in which the resin is extruded as a string shape from the die into pressurized liquid and cut directly by a rotary cutter attached to the die. The other is a method called a cold cut method, in which the resin is extruded once in the air as a string shape and then brought into coolant liquid, and the string-shaped resin is cut after cooling while being drawn up from the coolant. In comparison to the latter (the cold cut method), the former method (the hot-cut method) has the advantages in that the productivity of the expandable granules is high and the obtained granules are easily handled because spherical granules that have no edges can be obtained.

For example, a method for manufacturing the thermoplastic resin expandable granules by the hot-cut method has been proposed in which a thermoplastic resin and a blowing agent that has a boiling point of −50° C. to 0° C. are mulled in an extruder, extruded into water of 20° C. to 100° C. and equal to or less than 40 atmospheres, and cut into granules directly in the water (e.g., refer to Patent Document 1).

In addition, a method has been proposed in which a thermoplastic resin and a blowing agent are melted and mulled in an extruder, the resin is extruded into heated and pressurized liquid, and the resin is immediately cut into granules. Subsequently, the granules are cooled slowly in a pressurized container, the pressure in the container is released, and aging the granules under temperature conditions equal to or greater than 40° C. and equal to or less than a temperature 15° C. higher than the low temperature endothermic peak determined by DSC measurement (e.g., refer to Patent Document 2).

In addition, as a method for manufacturing thermoplastic resin expandable granules in which, unlike the processes described above, thermoplastic resin granules that do not contain a blowing agent are manufactured by a hot-cut method and a blowing agent is subsequently impregnated into the resin granules to manufacture thermoplastic resin expandable granules, a method has been proposed in which, when the thermoplastic resin is extruded from a nozzle die into water and cut by a cutter blade that rotates while in close contact with a die surface to form a spherical shape, the resin temperature is adjusted such that the viscosity of the melted resin at a die entrance is 100 to 50,000 poise and the extrusion rate per nozzle hole is 0.1 to 6.0 kg/hr (e.g., refer to Patent Document 3).

Alternatively, as a manufacturing method for spherical expandable polystyrene resin granules in which polystyrene resin granules containing a conjugate diene polymer are impregnated with a blowing agent in a water medium, a method has been proposed in which, prior to the impregnation of the resin granules with the blowing agent, the resin is melted in an extruder, extruded through extrusion holes, and cut. In this method, the shearing speed of the resin in the die land part is equal to or greater than 2,500 $sec^{-1}$ and equal to or less than 10,000 $sec^{-1}$, and the apparent viscosity is equal to or greater than 150 poise and equal to or less than 700 poise (e.g., refer to Patent Document 4).

Patent Document 1: Japanese Examined Patent Application, Second Publication No. S48-20423

Patent Document 2: Japanese Unexamined Patent Application, First Publication No. H07-314438

Patent Document 3: Japanese Unexamined Patent Application, First Publication No. S61-195808

Patent Document 4: Japanese Unexamined Patent Application, First Publication No. H09-208735

DISCLOSURE OF INVENTION

Problems to be Solved by the Invention

The Patent Documents 1 and 2 teach that when manufacturing the expandable granules by the hot-cut method, the selection of the blowing agent, the method for cooling the resin immediately after extrusion, and the aging conditions of the expandable granules after cutting, are important. In the methods disclosed in the Patent Documents 1 and 2, the expansion of the granules cannot be observed during the granule manufacture, and expandable granules which appear to be spherical and have a favorable external appearance can be obtained. However, there is a problem in that the mechanical strength of a molded product obtained by expansion-molding these expandable granules is inferior in comparison to a molded product that is expansion-molded using expandable granules obtained by a suspension polymerization impregnation method using identical raw materials. This tendency becomes particularly significant when the granule diameter is equal to or less than 1.5 mm.

In addition, the Patent Document 3 teaches that when manufacturing the resin granules by using the hot-cut method, the melt viscosity and the resin discharge rate of the resin passing through the die significantly influence the shape of the granules. However, in the Patent Document 3, the range of the disclosed condition that the melt viscosity be 100 to 50,000 poise is too broad. When a thermoplastic resin is extruded under general conditions, the melt viscosity naturally falls within this range; therefore, particularly when used in foamed products, the melt viscosity range in which expandable granules that have a superior strength can be obtained, is not defined.

In addition, the Patent Document 4 teaches that when manufacturing resin granules by using a hot-cut method, the shearing speed and the melt viscosity of the resin passing through the die significantly influence the shape of the granules. However, even if the shearing speed is adjusted so as to fall in a range between 2,500 sec$^{-1}$ and 10,000 sec$^{-1}$, an expandable granule having superior strength when used in foamed products, could not be obtained.

Specifically, the melt viscosity of the resin becomes significantly lower when a blowing agent is present therein, and thus the suggestions for resin viscosity and shearing speed disclosed in the Patent Documents 3 and 4, which are technologies in which the resin is extruded without impregnating a blowing agent, cannot serve as references when extruding expandable granules.

In consideration of the problems described above, an object of the present invention is to provide a manufacturing method for thermoplastic resin expandable granules that have a spherical shape and uniform diameter, and enables the manufacturing of foamed products having a superior mechanical strength.

Means for Solving the Problem

In order to attain the objects described above, the present invention is a manufacturing method for thermoplastic resin expandable granules in which: a blowing agent is injected under pressure into a thermoplastic resin that has been melted in an extruder; the melted resin containing the blowing agent is extruded directly into a coolant liquid through a large number of small holes of a die that is installed on a distal end of the extruder, this extrudate is cut by high-speed rotary blades; and the extrudate is cooled and solidified by bringing the extrudate into contact with a liquid to obtain expandable granules, wherein the resin is extruded so that the shearing speed of the melted resin containing the blowing agent is 12,000 to 35,000 sec$^{-1}$, and the apparent melt viscosity of the resin is 100 to 700 poise when the resin passes through land parts of the small holes of the die.

Preferably, in this method, the diameter of the small hole is 0.5 to 1.0 mm, and the die is used whose small holes have a land length of 2 to 4 mm.

Preferably, in this method, when a polystyrene resin is used as the thermoplastic resin, the resin temperature at an access into the die is set in a range between 150° C. and 180° C.

Preferably, in this method, when a polyethylene resin is used as the thermoplastic resin, the resin temperature at an access into the die is set in a range between 130° C. and 160° C.

Preferably, in this method, when a polypropylene resin is used as the thermoplastic resin, the resin temperature at an access into the die is set in a range between 180° C. and 210° C.

EFFECTS OF THE INVENTION

According to the method of the present invention, it is possible to carry out continuously melting of the resin, adding the blowing agent, mulling, cooling, and granulation by using an extruding and hot-cut method, and it is possible to manufacture expandable granules having a uniform granule diameter efficiently.

In addition, in the method of the present invention, when extruding the melted resin containing the blowing agent, by controlling the shearing speed and the melt viscosity of the resin in the land parts of small holes of the die within a particular range, it is possible to manufacture stably expandable granules from which an foamed product can be obtained that has a mechanical strength equivalent to an foamed product obtained by expandable granules that are obtained by the suspension polymerization impregnation method, which is difficult in the conventional hot-cut method.

BRIEF DESCRIPTION OF THE REFERENCE

Figure 1:
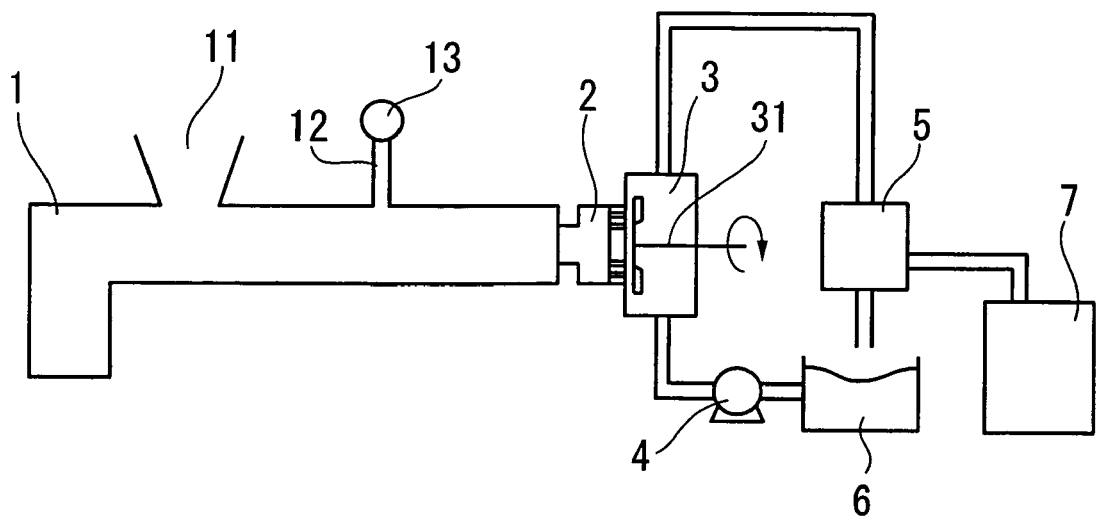
FIG. 1 is a schematic view showing an example of a manufacturing apparatus that is used to implement a manufacturing method for thermoplastic resin expandable granules of the present invention.

1: extruder
2, B: die
3, 112: cutting chamber
4: water-feeding pump
5: dewatering-and-drying device
6: water tank
7: chamber
11: raw material supply hopper
12: blowing agent supply opening
13: high pressure pump
31: cutter
101: die holder
102: melted resin conduit
103: die holder part heater
104: bolt
105: die main body
105a: resin-discharging surface
106: rod heater
107: tubular conduit
108: small hole
109: cutter rotating shaft
110: cutter blade support member
111: cutter knife
113: circulating liquid inlet
114: circulating liquid outlet
115a: heating medium inlet
116a: heating medium outlet
117: heating medium conduit
P, Q, and R: area

BEST MODE FOR CARRYING OUT THE INVENTION

Below, the present invention will be explained with reference to the drawings.

The present invention was completed based on the knowledge that significant differences occur when expandable granules, which have been obtained by systematically varying the shearing speed and the apparent melt viscosity of the resin when the resin passes through the die, are expansion-molded into various plate shapes and their strength is measured.

In the method of the present invention, a blowing agent is injected under pressure into a thermoplastic resin that has been melted in an extruder, the melted resin containing the blowing agent is extruded directly into a coolant liquid from a large number of small holes in a die installed on a distal end of the extruder, an extrudate is cut as it is extruded by high-speed rotary blades, and the extrudate is cooled and hardened by contacting with a liquid to obtain expandable granules. The extrudate is extruded so that, when passing through land parts of the small holes of the die, the shearing speed of the resin is 12,000 to 35,000 sec-1 and the apparent melt viscosity is 100 to 700 poise.

A feature of the present invention is in the point that when the thermoplastic resin containing the blowing agent is extruded from the small holes, the shearing speed and the apparent melt viscosity of the resin in the land parts of the small holes are strictly controlled, and this control becomes possible only by simultaneously adjusting both the structure of the die, in particular, the diameter and the land length of the small holes, and adjusting the resin temperature during extrusion.

In the die suitable for use in the present invention, the diameter of the small holes from which the resin is discharged is 0.5 to 1.0 mm and the land length "a" (refer to FIG. 2) of the small holes is 2 to 4 mm.

FIG. 1 shows an example of the manufacturing apparatus used to implement the manufacturing method for the thermoplastic resin expandable granules of the present invention. The manufacturing apparatus is constituted of: an extruder 1 that has a raw material supply hopper 11 and a blowing agent supply opening 12 that is connected to a high pressure pump 13; a die 2 that is installed on a distal end of the extruder 1; a cutting chamber 3 that rotatably accommodates a cutter 31 that is in close contact with a resin-discharging surface of the die 2 and has an inlet and an outlet for a circulating liquid; a water-feeding pump 4 that feeds the circulating liquid to the cutting chamber 3; a dewatering-and-drying device 5 to which the expandable granules and the circulating liquid are fed and that carries out solid-liquid separation; a water tank 6 that stores the circulating liquid; and a chamber 7 into which the dried expandable granules are conveyed.

In the method of the present invention, a general-purpose extruder can be used as the extruder 1. For example, a single shaft extruder, a two-shaft extruder, or two single shaft extruders connected together may be used, or a two-shaft extruder in a first stage connected to a single-shaft extruder in a second stage may be used.

Figure 2:
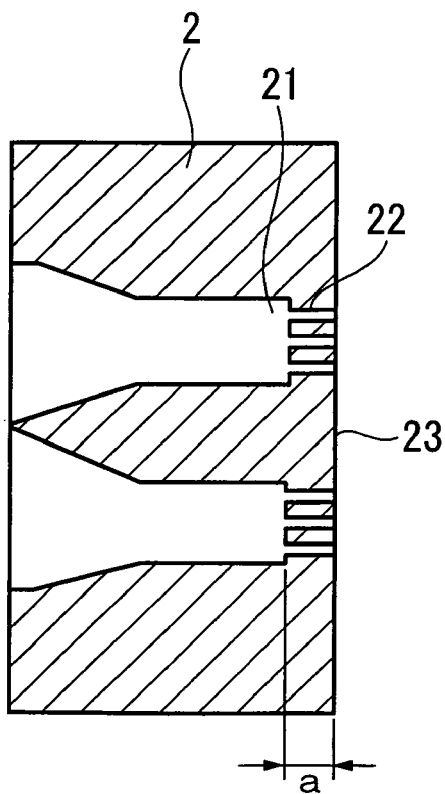
FIG. 2 is a longitudinal cross-sectional view showing an example of a die used in the manufacturing apparatus.

FIG. 2 is a drawing showing a longitudinal sectional view of the die 2 that is used in this manufacturing apparatus. In FIG. 2, the reference numeral 21 denotes a resin pressure detecting part, 22 denotes small holes, 23 denotes a die face surface, and "a" denotes the land length of the small holes. The thermoplastic resin heated and melted in the extruder 1 is mulled with a blowing agent that is injected under pressure from the blowing agent supply opening 12, pumped to the die 2 after being cooled, and extruded from the small holes 22 into the cutting chamber 3. The melted resin containing the blowing agent is extruded from the small holes 22 to contact the circulating liquid inside the cutting chamber 3, cut into a short flake shape by the cutter 31, formed into a spherical shape in the liquid, and cooled. The expandable granules that have been formed into a spherical shape in the circulating liquid are sent to the dewatering-and-drying device 5, and after the expandable granules have been separated from the circulating liquid, they are dried and stored in the chamber 7.

In the die 2, the shearing speed in a die land part through which the melted resin containing the blowing agent passes is calculated by the following equation 1:

$$\tau = 4q/(\pi \cdot r3) \quad (1)$$

Here, "$\tau$" denotes the shearing speed (sec$^{-1}$), "q" denotes the volume of the resin discharge rate (cm$^3$/sec) per hole, "$\pi$" denotes the ratio of the circumference of a circle to the diameter, and "r" denotes the radius (cm) of the small holes.

In addition, the apparent melt viscosity of the resin is calculated by the following equation 2:

$$\eta = (\Delta P \cdot \pi \cdot g \cdot r4 \cdot \rho)/(8Q \cdot L) \quad (2)$$

Here, "$\eta$" denotes the apparent melt viscosity (kg/(cm·sec)), $\Delta P$ denotes the pressure loss (kg/cm2) of a small holes land part, "$\pi$" denotes the ratio of the circumference of a circle to the diameter, "g" denotes the gravitational acceleration (cm/sec2), "r" denotes the radius (cm) of the small holes, "$\rho$" denotes the resin density (kg/cm3), Q denotes the resin mass discharge rate per small hole (kg/sec), and L denotes the land length (cm) of the small holes.

More concretely, the detected pressure at the position shown by reference numeral 21 in FIG. 2 is used as the value of $\Delta P$, and the value of "g" is 980 cm/sec$^2$. In addition, because the small holes 22 of the die 2 do not necessarily all discharge the resin effectively, the effective number of holes for calculating "q" and Q is calculated by measuring the mass of 1,000 obtained expandable granules, and the average value thereof serves as the actual granule mass. The number of holes effectively working is calculated by comparing the actual granule mass with a theoretical granule mass value. The theoretical granule mass value is calculated from the mass of the resin supplied to the extruder 1 per hour and the number of cutting per hour by the cutter 31 (the rotation number per hour×the number of cutters), assuming that all of the small holes 22 are effectively working.

According to the equation (1), the shearing speed "r" is proportional to the resin quantity "q" that is discharged from one small hole 22, and inversely proportional to the third power of the radius "r" of the small holes 22. Here, the shearing speed of the resin when passing through the small holes 22 influences the shape of the obtained granules. In order to obtain granules having a true spherical shape with uniform diameters, it is necessary to maintain the shearing speed in a range of 12,000 to 35,000 sec-1. When the shearing speed is less than 12,000 sec-1, the granules acquire a distorted shape, and when these granules are expanded, the expanded granules acquire a flattened disc shape. In addition, when the shearing speed exceeds 35,000 sec-1, cutting by the cutter 31 is not favorable, burr-shaped projections are produced on the granules, and powdering of the resin also occurs frequently.

Here, the rate of discharge of the resin from the small holes 22 can be simply adjusted by using a die 2 whose number of holes depends on the amount of resin supplied per hour to the extruder 1, and the diameter of the small holes 22 may be 0.5 to 1.0 mm. When the diameter exceeds 1.0 mm, it becomes difficult to adjust the shearing speed equal to or greater than 12,000 sec-1, and alternatively, when less than 0.5 mm, it becomes difficult to adjust the shearing speed equal to or less than 35,000 sec-1. This is not preferable.

In addition, in order to obtain spherical expandable granules from which a foamed product having a superior mechanical strength is obtained by expansion, it is necessary to maintain the apparent melt viscosity of the resin when passing through the small holes 22 between 100 to 700 poise. According to the above equation (2), the apparent melt viscosity is proportional to the pressure loss ΔP while the resin is passing through the small holes 22, that is, the resin pressure in the die.

The adjustment of this resin pressure is carried out by setting the temperature of the resin during extrusion. The higher the temperature becomes, the lower the resin pressure becomes, which in turn causes the melt viscosity to become low. In addition, the resin melt viscosity during extrusion can also be adjusted by the land length "a" of the small holes 22. In order to simplify the adjustment of the melt viscosity, preferably the land length "a" of the small hole 22 is 2 to 4 mm. When the land length "a" exceeds 4 mm, the resin pressure at the small holes 22 becomes high, and thereby the resin temperature adjustment for maintaining the proper melt viscosity range becomes difficult, which is not preferable. In addition, when the land length "a" is less than 2 mm, the flow of the resin in the hole portion deteriorates, and the shape and the size of the cut granules become uneven, which is not preferable.

When the melt viscosity is less than 100 poise, suppressing the expansion of the granules during cutting becomes difficult, adhesion between the cut granules is caused, and when these granules are expansion-molded, only a molded product having a weak mechanical strength can be obtained. Alternatively, when the melt viscosity exceeds 700 poise, although granules become ones from which the foamed products obtained by expansion-molding have a superior mechanical strength when expanded, the shape becomes distorted, and the expanded granules that expand into these foamed products become flat granules. Thus, the filler properties deteriorate when filled into molds during molding, the size and the shape of the expanded granules that appear at the surface of the molded products are uneven, and therefore the external appearance is not preferable. The range of the apparent melt viscosity is more preferably 200 to 500 poise.

Examples of thermoplastic resins that can be used in the present invention, while not particularly limited, are: polystyrene, styrene/butadiene copolymers, styrene/methacrylate copolymers, styrene/maleic anhydride copolymers, aromatic vinyl resins such as AS resins and ABS resins, vinyl chloride resins such as polyvinyl chloride, polyvinylidene chloride, vinyl chloride/vinyl acetate copolymers; olefin resins such as polyethylene, polypropylene, polybutene, polyethylene-vinyl acetate copolymers; acrylic resins such as polymethyl acrylate, polyethyl acrylate, and methyl methacrylate/styrene copolymers; polyester resins such as polyethylene terephthalate and polybuthylene-terephthalate; amide resins such as polycaprolactone and poly hexamethylene adipamide; and separately or in compounds of polyurethane, polycarbonate, polyetherimide, polyphenylene ether, and poly lactic acid. Among these, aromatic vinyl resins and olefin resins are particularly advangateous.

Examples of blowing agents that can be used in the present invention are: aliphatic hydrocarbons such as propane, normal butane, isobutene, normal pentane, isopentane, neopentane, and cyclopentane; ethers such as dimethyl ether and diethyl ether; various alcohols such as methanol and ethanol; and carbonic acid gas, nitrogen, and water. Among these, the aliphatic hydrocarbons are advantageous, and furthermore, separately or in compounds, normal butane, isobutene, normal pentane, or isopentane are particularly advantageous. The added amount of the blowing agent can be increased or decreased depending on the target expansion ratio of the expandable granules, but generally, a range of 2 to 15 parts by weight per 100 parts by weight of resin is preferable.

Preferably, a bubble nucleating agent, which is for adjusting the bubbles when the expandable granules expand, is compounded into the resin composition used in the present invention. Examples of the bubble nucleating agent that can be used are powders such as talc, calcium carbonate, magnesium carbonate, diatom earth, calcium stearate, magnesium stearate, barium stearate, zinc stearate, aluminum stearate, silica, and Teflon (trademark) powder, in addition to sodium bicarbonate, citric acid, and azodicarboxamide. However, among these, preferably 0.2 to 2.0 parts by weight powdered talc is added to the resin. In addition, a flame retardant, an antistatic agent, a coloring agent or the like may be added.

The temperature of the melted resin differs depending on the type of resin that is used, and preferably the temperature of the expandable resin in the access into the die is adjusted to 50 to 100° C. above the melting point of the resin. In addition, it is necessary to extrude the resin directly into a liquid so that the extruded string-shaped expandable resin does not expand. Preferably, the temperature of the liquid used for this resin coolant is set 100 to 200° C. lower than the resin temperature at the access into the die.

For example, if the resin to be used is a styrene resin, it is necessary to heat the resin to about 200 to 230° C. so that it will melt completely in the extruder 1. However, the temperature of the resin in the access into the die is preferably as low as possible within the range in which the flow of the resin does not deteriorate, preferably about 150 to 180° C. The temperature of the liquid used to cool the resin at this time is preferably 30 to 60° C. Warm water is suitable as the liquid.

At this time, when the temperature of the liquid is too high, the granules expand during cutting and adhere together, which is not preferable. Alternatively, when the temperature of the liquid is extremely low, the resin in the small holes 22 solidifies and the clogging of the small holes 22 occurs, which is not preferable.

In the case in which the resin to be used is a polyethylene resin (the proportion of the polyethylene in the resin as a whole is equal to or greater than 50%), the temperature of the resin in the access into the die is preferably about 130 to 160° C., and the temperature of the liquid used to cool the resin at this time is preferably 20 to 50° C.

Furthermore, in the case in which the resin to be used is a polypropylene resin (the proportion of the polypropylene to the resin as a whole is equal to or greater than 50%), the temperature of the resin in the access into the die is preferably about 180 to 210° C., and the temperature of the liquid used to cool the resin at this time is preferably 40 to 70° C.

The expandable resin that has been extruded directly into the resin coolant liquid is cut immediately after being extruded into the liquid by the cutter that rotates in close contact with the die face surface and cooled to form expandable granules. In this manner, based on controlling the extrusion conditions within an appropriate range, the manufactured granules are almost completely spherical and have diameters slightly larger than the diameter of the holes in the die. The expandable granules are conveyed along with water through conduits, and after being dewatered and dried, are made into a product.

To manufacture foamed products by molding the thermoplastic resin expandable granules obtained by the method described above in a mold, it is possible to use conventional well-known expansion-molding methods and apparatuses. For example, in the case in which the resin is a styrene resin, the pre-expanded granules, which have been obtained by expanding the expandable granules 10 to 100 times by using steam, are aged a certain amount of time and subsequently are filled into a mold and reheated using steam to obtain the foamed products having the desired shape.

According to the method of the present invention, it is possible to carry out continuously, using the extrusion hot-cut method, the melting of the resin, adding the blowing agent, mulling, cooling, and granulation; and it is possible to manufacture efficiently expandable granules having uniform grain diameters.

In addition, in the method of the present invention, when extruding the melted resin containing the blowing agent, by controlling the shearing speed and the melt viscosity of the resin in the land parts of small holes of the die within a predetermined range, it is possible to manufacture stably expandable granules from which foamed products having a mechanical strength equivalent to foamed products obtained by expandable granules that are obtained by using a suspension polymerization method are obtained, and which was difficult when using the conventional hot-cut method.

TEST EXAMPLE

Below, the effect of the present invention is clarified by test examples comparing test examples of the present invention with comparative examples made using the conventional method.

In the following test examples and comparative examples, the values of the sphericity of the pre-expanded granules and the density and the flexural strength of the foamed products are measured respectively by the following methods.

<Sphericity of the Pre-Expanded Granules>

To find the sphericity of the pre-expanded granules, the pre-expanded granules obtained by expanding the expandable granules were positioned in a vernier caliper, the grain diameter was measured from various angles, the largest diameter W1 and the smallest diameter W2 were extracted, and the sphericity was calculated by using the following equation (3):

$$K = W1/W2 \quad (3)$$

In addition, the sphericity was evaluated in the following manner:

Evaluation Value of K

○ equal to or greater than 1.0 and less than 1.3

△ equal to or greater than 1.3 and less than 1.6

× equal to 1.6 or greater

<Molded Product Density>

The density of the molded product was measured using the method disclosed in "Expanded Plastics and Rubbers: Measuring the Apparent Density" in JIS K7222: 1999. Specifically, a 10×10×5 cm test piece from a molded product was cut such that the cell structure of the test piece was not altered, the mass thereof was measured, and the density obtained using the following equation (4):

$$\text{Density}(g/cm3) = \text{test piece mass}(g)/\text{test piece volume (cm3)} \quad (4)$$

<Flexural Strength of the Molded Product>

The flexural strength was measured by the method disclosed in "Expanded Plastics Heat Insulating Materials", JISA9511: 1999. Specifically, using a Tensilon general testing machine UCT-10T (made by Orientec), the test piece size was 75×300×15 mm, the compression rate was 10 mm/min, the assembly had a 10R loading nose and 10R supports, and the distance between the supports was 200 mm. The measurement was carried out, and the flexural strength was calculated by using the following equation:

$$\text{Flexural strength (MPa)} = 3FL/2bh2 \quad (5)$$

(Here, F denotes the largest flexural load (N), L denotes the distance (mm) between supports, "b" denotes the width (mm) of the test piece, and "h" denotes the thickness (mm) of the test piece.)

Test Example 1

In this test example, the expandable granules according to the present invention were manufactured by using the apparatus shown in FIG. 1.

In a tumbler, 0.3 parts by weight of powdered talc was mixed in advance with 100 parts by weight of polystyrene resin (Toyo Styrene; HRM10N). This mixture was continuously supplied to a single-shaft extruder having a 90 mm opening diameter at a rate of 100 kg per hour. The temperature in the extruder was set to the highest temperature of 210° C. After the resin was melted, 6 parts by weight of isopentane as the blowing agent was injected under pressure into the resin in the course of the extrusion. The resin and blowing agent were mulled and cooled in the extruder. While the temperature of the resin at the end of the extruder was maintained at 170° C. and the pressure at the resin access into the die was maintained at 14 MPa, the blowing agent-containing melted resin was extruded via a die into the cutting chamber communicating with the die and in which 40° C. water was circulating, and simultaneously, the extrudate was cut by a high speed rotating cutter that has 10 blades arranged in the circumferential direction. The die has 150 small holes having a diameter of 0.6 mm and a land length "a" of 3.5 mm. The cut granules were cooled, dewatered, and dried to obtain the expandable granules. The obtained expandable granules had no deformations, burrs, or the like, and the granules had almost perfect spherical shapes with diameters of approximately 0.8 mm. At this time, when the shearing speed and the apparent melt viscosity of the melted resin containing the blowing agent when passing through the land parts of small holes of the die is calculated based on the equations described above, the shearing speed was 15,608 sec$^{-1}$, and the apparent melt viscosity was 360 poise.

After aging for 72 hours, the obtained expandable granules were heated for two minutes in a box-shaped blower at 0.5 kg/cm$^2$ and became pre-expanded granules. After resting for 24 hours, the pre-expanded granules were filled into a 300× 400×50 mm mold. The foamed product was molded by blowing steam into the mold for 20 seconds at a gauge pressure of 1.0 kg/cm$^2$. At this time, the sphericity of the pre-expanded granules was 1.15, the density of the obtained foamed products was 0.025 g/cm$^3$, and the flexural strength was measured at 0.65 MPa.

Test Example 2

In a test example 2, the same resins and composition were adopted as the test example 1. The equipment of the test example 2 is the same as that of the test example 1 excepting the modified die. The expandable granules were manufactured while the extrusion conditions were adjusted, and these expandable granules were pre-expanded and molded in a mold similarly to the test example 1. The sphericity of the obtained pre-expanded granules and the density and flexural strength of the molded products were measured. The specifications for the die, the extruding conditions, the sphericity of the pre-expanded granules, and the density and flexural strength of the molded products are shown in TABLE 1.

Comparative Examples 1 to 3

In comparative examples 1 to 3, the same resins and composition were adopted as the test example 1. The equipment of the comparative example 2 is the same as that of the test example 1, excepting a modified die. The expandable granules were manufactured while the extrusion conditions were adjusted, and these expandable granules were pre-expanded and molded in a mold similarly to the test example 1. The sphericity of the obtained pre-expanded granules and the density and flexural strength of the molded products were measured. The specifications for the die, the extruding conditions, the sphericity of the pre-expanded granules, and the density and flexural strength of the molded products are shown in TABLE 1 and TABLE 2.

Test Example 3

In a test example 3, the same apparatus as the test example 1 was used, but the resin was altered to the mixture of polyethylene resin (Nihon Polyolefin KK: JE 111D) and polystyrene resin (Toyo Styrene KK: HRM1ON), mixed respectively at 60/40 mass ratio, and the expandable granules were obtained. The obtained expandable granules were made into pre-expanded granules in a heating-and-steaming container immediately after manufacture, and subsequently, a foamed product was obtained by the same method as that in the test example 1. The sphericity of the pre-expanded granules and the density and flexural strength of the molded products was measured. The specifications for the die, the extrusion conditions, the sphericity of the pre-expanded granules, and the density and flexural strength of the molded products are shown in TABLE 2.

Test Example 4

In a test example 4, the same apparatus as the test example 1 was used, but the resin was altered to the mixture of polypropylene resin (Mitsui-Sumitomo Polyolefin KK: S131) and polystyrene resin (Toyo Styrene KK: HRM1ON) mixed respectively at 60/40 mass ratio, and the expandable granules were obtained. The obtained expandable granules were made into pre-expanded granules in a heating-and-steaming container immediately after manufacture, and subsequently, a foamed product was obtained by the same method as that in the test example 1. The sphericity of the pre-expanded granules and the density and flexural strength of the molded products was measured. The specifications for the die, the extrusion conditions, the sphericity of the pre-expanded granules, and the density and flexural strength of the molded products are shown in TABLE 2.

Comparative Example 4

In a comparative example 4, a composition of resin is same as that in the test example 1, but the resin was extruded without injecting the blowing agent under pressure and cut into resin granules. Next, the resin granules were placed in a pressurized container, isobutene, serving as the blowing agent, was added at 15 parts per weight to 100 parts per weight of resin granules in a water medium having a dispersing agent and a plasticizer (toluene), and a blowing agent impregnation treatment was carried out for 4 hours at 70° C. The resin granules were cooled to room temperature and dewatered; then the expandable granules were obtained. These expandable granules were made into foamed products by the same method as that in the test example 1. The density and the flexural strength of the foamed product are shown in TABLE 2.

Test Example 5

In this test example 5, the same apparatus and the equipment as the test example 1 were used excepting the die was modified into a die B which has a countermeasure for preventing the clogging of small holes 108 through which the resin was discharged, and the expandable granules were manufactured while adjusting the extrusion conditions.

Figure 7:
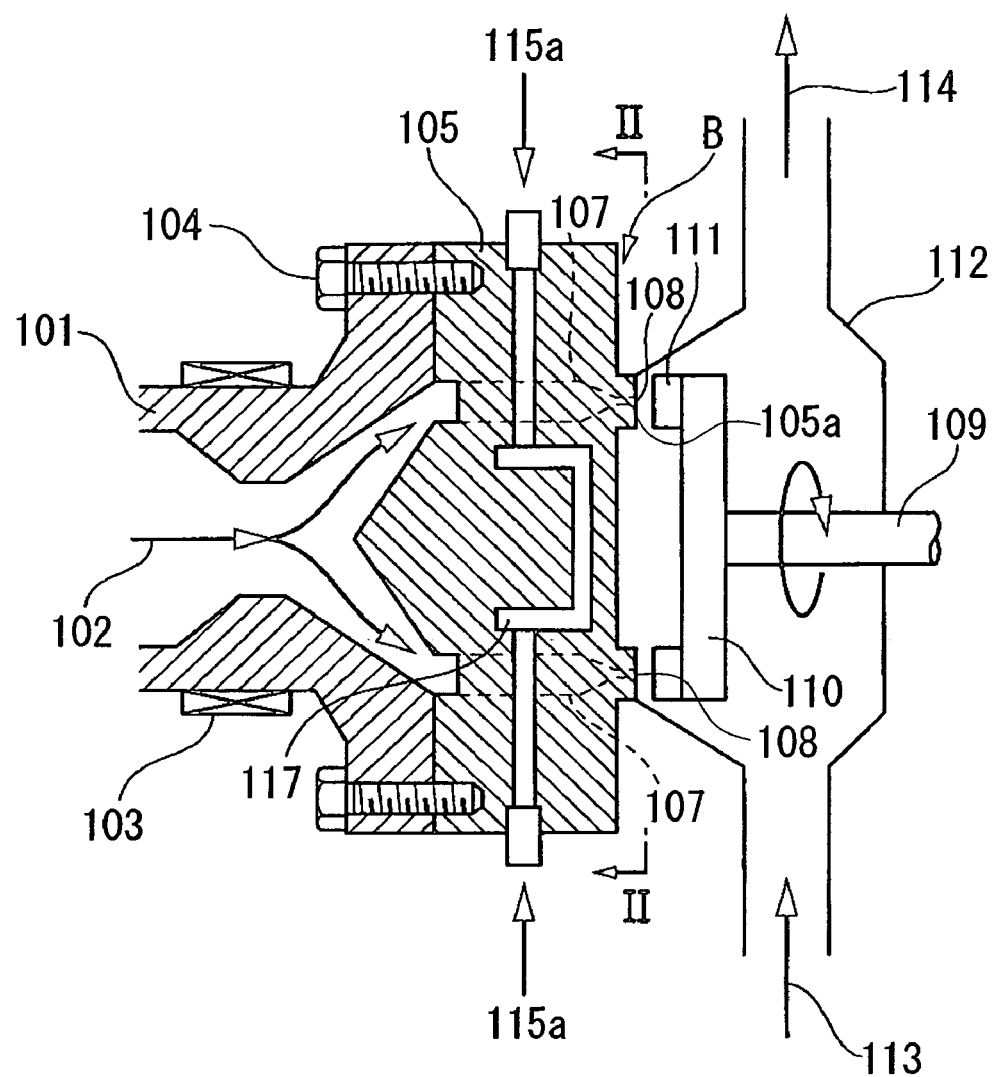
FIG. 7 is a cross-sectional view showing another example of a die used in the manufacturing apparatus.
Figure 8:
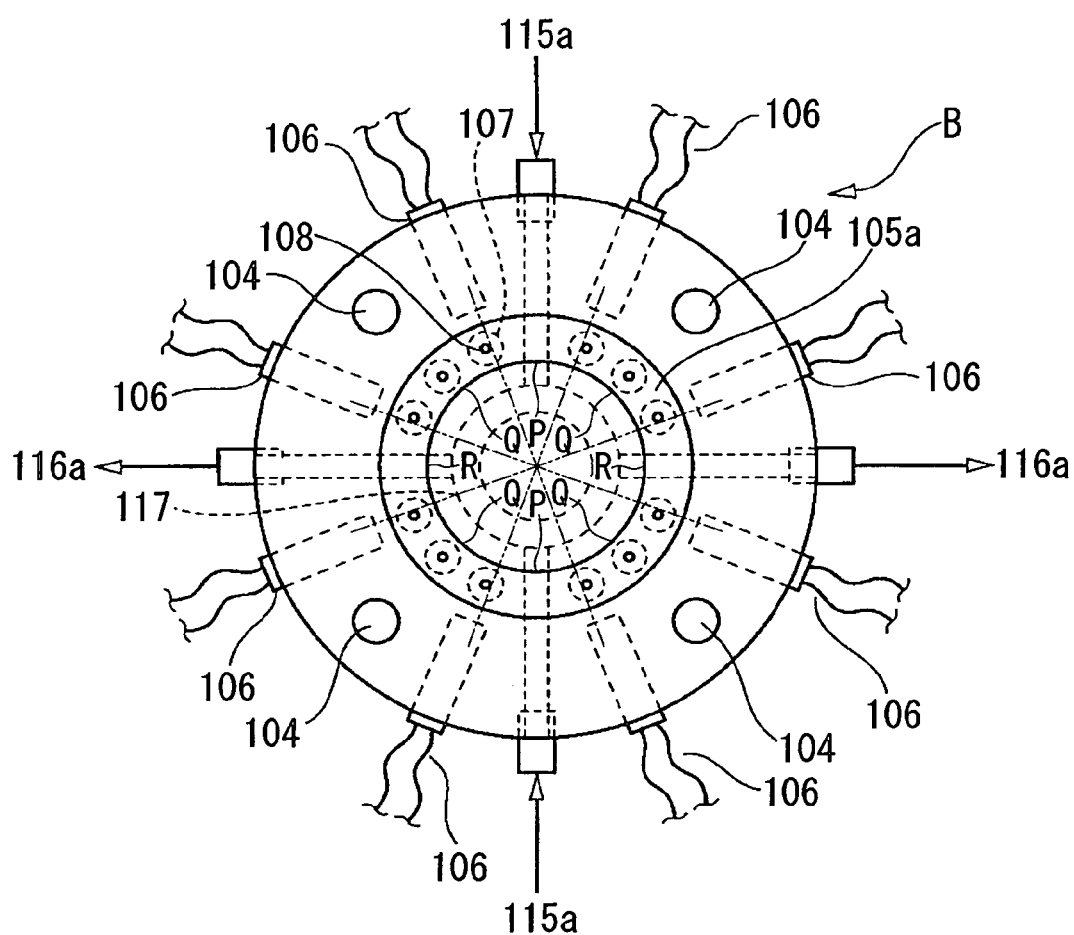
FIG. 8 is a view taking along a line II-II of FIG. 7.
Figure 9:
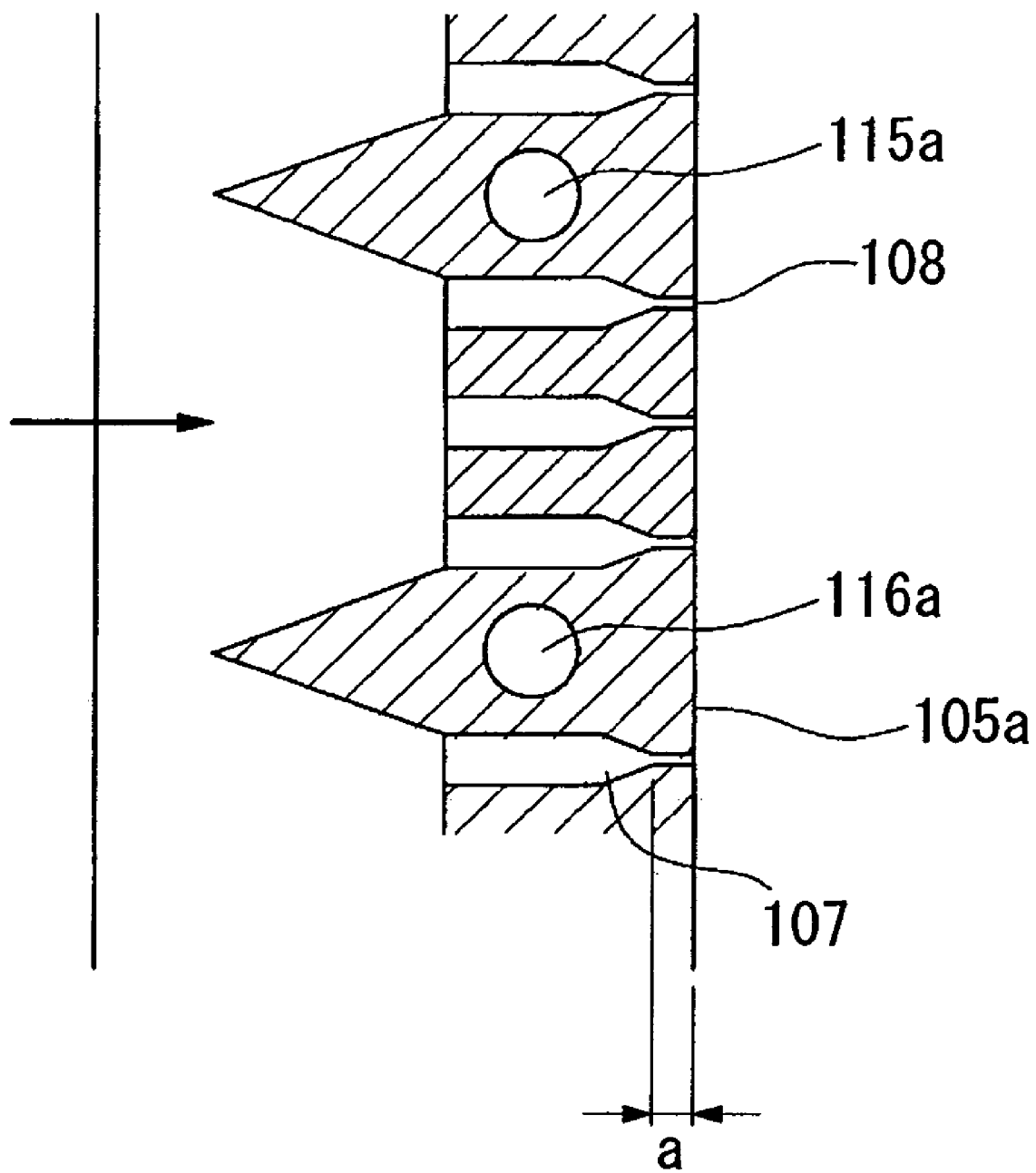
FIG. 9 is an exploded view showing a tubular conduit portion of the die shown in FIG. 7.

The die B used in this test example is shown in FIG. 7 to FIG. 9. In the die B shown in FIG. 8, 12 tubular conduits (resin conduits) 107 in the areas Q and one small hole 108 for each of the tubular conduits 107 are shown. However, in the die B used in this test example, 16 tubular conduits 107 are provided in the areas Q, and 10 small holes 108 are provided for each of the tubular conduits 107.

This die B has a die holder 101 that is fixed to a distal end of the extruder (not illustrated) and a die main body 105 that is fixed to a distal end of the die holder 101. An interior of the die holder 101 which forms a tube, serves as a melted resin conduit 102 that communicates with the end of the extruder. Reference numeral 103 denotes a die holder part heater, and reference numeral 104 denotes a bolt for attaching the die main body 105. A plurality of rod heaters 106 is inserted into the die main body 105. In this die B, resin passes from the end of the extruder through the melted resin conduit 102 and the tubular conduits 107, and is extruded from the plurality of small holes 108 provided on each resin-discharging surface 105a.

A cutter that has a cutter rotating shaft 109, a cutter blade support member 110, and cutter knives 111, is accommodated in the cutting chamber 112 that is connected to a resin-discharging surface 105a of this die B, and the cutting chamber 112 has a circulating liquid (coolant liquid) inlet 113 and a circulating liquid outlet 114. In this cutting chamber 112, the cutters are rotated in the circulating liquid water, the resin discharged from the resin-discharging surface 105a is immediately cut in the water, and the obtained granules are conveyed out from the circulating liquid outlet 114 along with the flowing water (circulating liquid).

The die main body 105 has the plurality of the tubular conduits 107 that communicate with the melted resin conduit 102 and that communicate with the plurality of small holes 108 that open into the resin-discharging surfaces 105a of the die main body 105 therein. The tubular conduits 107 are provided on a circle defined on the resin-discharging surfaces 105a. However, as shown in FIG. 8, the small holes 108 and the tubular conduits 107 are not provided in areas P (preferably having a central angle of 10° to 50°) in the inflow direction and the outflow direction of the water stream (the coolant liquid stream) of the resin-discharging surface 105a, and the areas R (preferably, having a central angle of 10° to 50°), which is orthogonal thereto. The small holes 108 are formed only in areas Q, and are not formed in areas P and R. As can be understood from FIG. 8, a resin-discharging surface 105a of the die main body 105 is circular, and the small holes 108 are arranged on an ideal circle that has a diameter that is smaller than the outer circumference of the resin-discharging surface 105a and is concentric to the resin-discharging surface 105a only in the areas Q, excluding the vertical and horizontal areas P and R, when viewed from the center of the circle.

The bottom of the resin-discharging surface 105a aligns with the direction of the circulating liquid inlet 113, the top of the resin-discharging surface 105a aligns with the direction of the circulating liquid outlet 114, and the left-and-right directions of the resin-discharging surface 105a align with the direction orthogonal to the direction that connects the circulating liquid inlet 113 and the circulating liquid outlet 114.

In the die B, the small holes 108 that discharge the resin have a diameter of 0.6 mm and a land length "a" of 3.5 mm, and a total of 160 small holes 108 are arranged on a circle defined on the resin-discharging surface 105a. The small holes 108 are not provided in either the areas P (having a central angle of 25°), which lie in the inflow direction 113 and the outflow direction 114 of the water (circulating liquid) that fills the cutting chamber 112 in contact with the resin-discharging surface 105a, or the areas R (having a central angle of 25°), which lie in the direction orthogonal to the inflow direction 113 and the outflow direction 114 of the water. A heating medium conduit 117 for heating the resin in the small holes 108 is provided in the die B. A heating medium inlet 115a that communicates with this heating medium conduit 117 is provided on the upper and lower areas P on the resin-discharging surface 105a. A heating medium outlet 116a that communicates with the heating medium conduit 117 is provided on the right and left areas R on the resin-discharging surface 105a.

In the present test example, the resin was supplied to the extruder at a rate of 120 kg per hour, the highest temperature of the extruder was set to 220° C., 6 parts per weight of isopentane based on the weight of the resin as a blowing agent was added and mixed into the resin, and the resin was introduced into the die B while maintaining the resin temperature at the distal end of the extruder at 168° C. While thermal oil (heating medium) at 230° C. was circulated in the heating medium conduit 117 of the die, the resin was extruded into the cutting chamber 112 in which 40° C. water circulated and simultaneously cut by high-speed rotary cutters identical to those in the test example 1 to obtain the expandable granules.

The resin pressure in the access into the die was 12 MPa. The obtained expandable granules were almost true spherical granules having a diameter of 0.7 mm, and the point was ascertained that there were fewer cloggings of the small holes than the test example 1 in terms of the relationship between the number of cuts with respect to the resin-discharging rate and the granule diameter, and the resin pressure in the access into the die. When the shearing speed and the apparent melt viscosity of the melted resin when passing through the die were calculated based on the above equations, the shearing speed was 13,691 sec-1 and the apparent melt viscosity was 352 poise.

Pre-expanding and molding of the obtained expandable granules was carried out using the method identical to that of the test example 1, and the sphericity of the obtained pre-expanded granules and the density and flexural strength of the molded products were measured. The measurements are shown along with the extrusion conditions in TABLE 3.

TABLE 1

|  | Test example 1 | Test example 2 | Comparative example 1 | Comparative example 2 |
|---|---|---|---|---|
| Used raw material (% wt) | PS (100%) | PS (100%) | PS (100%) | PS (100%) |
| Mold |  |  |  |  |
| Hole diameter (mm) | 0.6 | 0.5 | 0.5 | 0.8 |
| Hole numbers (unit) | 150 | 200 | 200 | 100 |
| Land length (mm) | 3.5 | 3.5 | 3.5 | 5.0 |
| Blowing agent |  |  |  |  |
| Type | Isopentane | Isopentane | Isopentane | Isopentane |
| Impregnated amount (% wt) | 6 | 6 | 5 | 5 |
| Resin temperature (° C.) | 170 | 172 | 210 | 170 |
| Pressure at access into metal mold (MPa) | 14 | 21 | 21 | 21 |
| Cutting chamber water temperature (° C.) | 40 | 40 | 40 | 40 |
| shearing speed (sec$^{-1}$) | 15,608 | 31,007 | 36,445 | 13,158 |
| apparent melt viscosity (poise) | 360 | 240 | 210 | 894 |
| Pre-expanded granule sphericity | 1.15 ○ | 1.10 ○ | 1.38 △ | 1.82 X |
| Molded product strength (g/cm$^3$) | 0.025 | 0.024 | 0.030 | 0.026 |
| Molded product flexural strength (MPa) | 0.65 | 0.58 | 0.42 | 0.70 |

TABLE 2

|  | Comparative Example 3 | Test example 3 | Test example 4 | Comparative example 4 |
|---|---|---|---|---|
| Used raw material (% wt) | PS (100%) | PE (60%) PS (40%) | PP (60%) PS (40%) | PS (100%) |
| Mold |  |  |  |  |
| Hole diameter (mm) | 0.4 | 0.6 | 0.6 | — |
| Hole numbers (unit) | 240 | 150 | 150 | — |
| Land length (mm) | 3.0 | 3.5 | 3.5 | — |
| Blowing agent |  |  |  |  |
| Type | Isopentane | Isopentane | Isopentane | Isobutane |
| Impregnated amount (% wt) | 6 | 6 | 6 | 15 (after impregnation) |
| Resin temperature (° C.) | 214 | 152 | 202 | — |
| Pressure at access into metal mold (MPa) | 24 | 12 | 18 | — |
| Cutting chamber water temperature (° C.) | 40 | 30 | 60 | — |
| shearing speed (sec$^{-1}$) | 45,304 | 18,721 | 32,445 | — |

TABLE 2-continued

|  | Comparative Example 3 | Test example 3 | Test example 4 | Comparative example 4 |
|---|---|---|---|---|
| apparent melt viscosity (poise) | 160 | 240 | 370 | — |
| Pre-expanded granule sphericity | (burrs) X | 1.18 ○ | 1.25 ○ | — |
| Molded product strength (g/cm³) | 0.025 | 0.036 | 0.040 | 0.025 |
| Molded product flexural strength (MPa) | 0.38 | 0.52 | 0.46 | 0.56 |

TABLE 3

|  | Test example 5 |
|---|---|
| Used raw material (% wt) | PS (100%) |
| Metal mold |  |
| hole diameter (mm) | 0.6 |
| hole number (units) | 160 |
| land length (mm) | 3.5 |
| blowing agent |  |
| type | Isopentane |
| impregnation amount (parts by weight) | 6 |
| Resin temperature (° C.) | 168 |
| Pressure at access into mold (MPa) | 12 |
| Cutting chamber water temperature (° C.) | 40 |
| shearing speed (sec⁻¹) | 13,691 |
| apparent melt viscosity (poise) | 352 |
| Pre-expanded granules sphericity | 1.10 ○ |
| Molded product density(g/cm³) | 0.025 |
| Molded product flexural strength (MPa) | 0.070 |

According to the results shown in TABLE 1 and TABLE 2, the pre-expanded granules made from the expandable granules manufactured according to the methods and apparatus of the test examples 1 and 2 according to the present invention exhibit an advantageous sphericity. In addition, when the obtained granules are made into foamed products, the molded product flexural strength is strong, and has a strength that is not inferior to the molded products made of the expandable granules obtained by the method shown in the comparative example 4, in which the granules are impregnated after formation. In addition, the expandable granules manufactured in the test examples 3 and 4, although they cannot be compared directly because the resin compositions of the expandable granules were different from that of the comparative example 4, have a granule shape and molded product strength of practical use.

In contrast, in the comparative example 1 and the comparative example 3, because the shearing speed of the resin at the land parts was too high, the produced expandable granules tended to have some foam and burr-shaped projections, and thus the strength of the foamed products was also extremely weak.

In comparative example 2, because the apparent melt viscosity of the resin in the die land part was too high, the produced expandable granules were flat, the sphericity of the pre-expanded granules was extremely poor, and when these were molded, the size of the expanded granules at the surface of the molded product was uneven, and thus the external appearance deteriorated.

As shown in TABLE 3, in the test example 5, it is possible to manufacture expandable granules stably over a long period of time, and at the same time, the obtained expandable granules had a high sphericity, and when these expandable granules were expansion-molded, molded products having a superior strength were obtained. That is, the die B used in the test example 5 was effective in preventing clogging of the small holes 108 through which the resin is discharged, and as a result, it was understood that it is possible to maintain a low die pressure during extrusion. Note that in this die B, it was possible to obtain the effect of clogging prevention by providing small holes 108 at least one but not both of the positions in the inflow direction 113 and the outflow direction 114 of the water stream and the position in the direction orthogonal to the inflow direction 113 and the outflow direction 114 of the water stream.

The influence of Each of the Parameters on the Foamed Product Strength.

FIG. 3 to FIG. 6 are graphs showing the result of investigating the influence that each of the parameters had on the strength (maximum flexural load) of the molded products obtained by expansion-molding the expandable granules when the expandable granules are manufactured by using a polystyrene resin identical to that in the test example 1. The parameters were the molecular weight of the resin, the resin melt viscosity, and the shearing speed.

Figure 3:
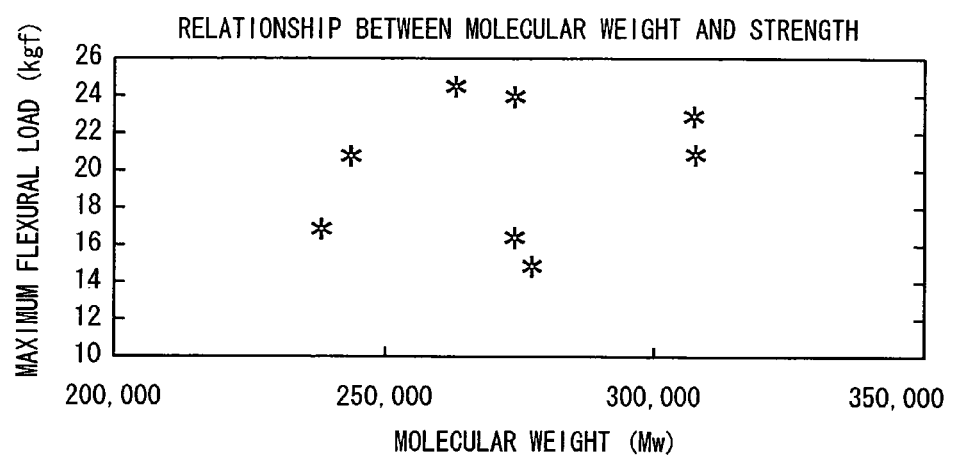
FIG. 3 is a graph showing a relationship between the molecular weight of the resin used for manufacturing the expandable granules and the strength of a molded product.

FIG. 3 is a graph showing the relationship between the molecular weight of the resin used in the manufacture of the expandable granules and the strength of the molded products. Concerning the range of the molecular weights shown in FIG. 3, a clear interrelationship between the molecular weight of the resin and the molded product strength could not be found.

Figure 4:
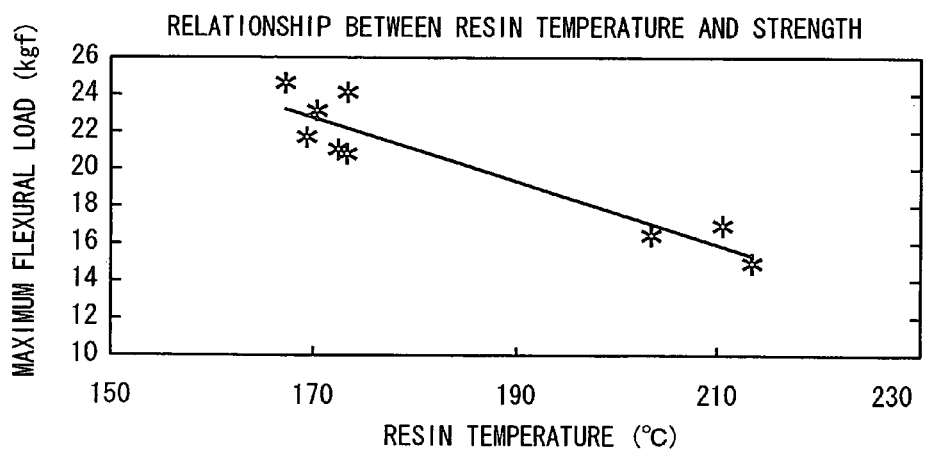
FIG. 4 is a graph showing a relationship between the resin temperature during the manufacture of the expandable granules and the strength of a molded product.

FIG. 4 is a graph showing the relationship between the temperature of the resin during the manufacture of the expandable granules and the strength of the molded product. As shown in FIG. 4, a tendency could be observed in which the strength of the molded product increased as the temperature of the resin decreased.

Figure 5:
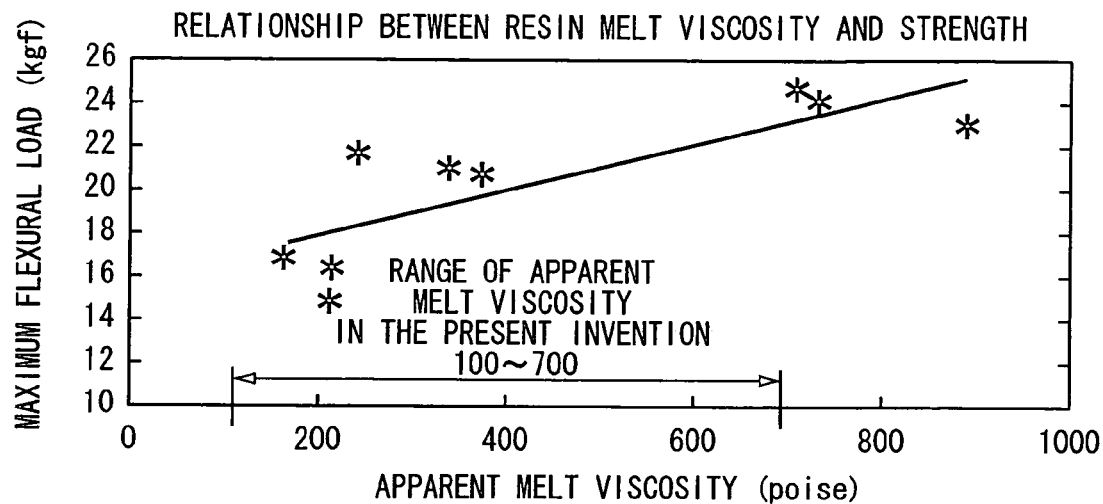
FIG. 5 is a graph showing a relationship between the resin melt viscosity during the manufacture of the expandable granules and the strength of a molded product.

FIG. 5 is a graph showing the relationship between the resin melt viscosity (apparent melt viscosity) during the manufacture of the expandable granules and the strength of the molded product. As shown in FIG. 5, a tendency could be observed in which the strength of the molded product increased as the resin melt viscosity increased.

Figure 6:
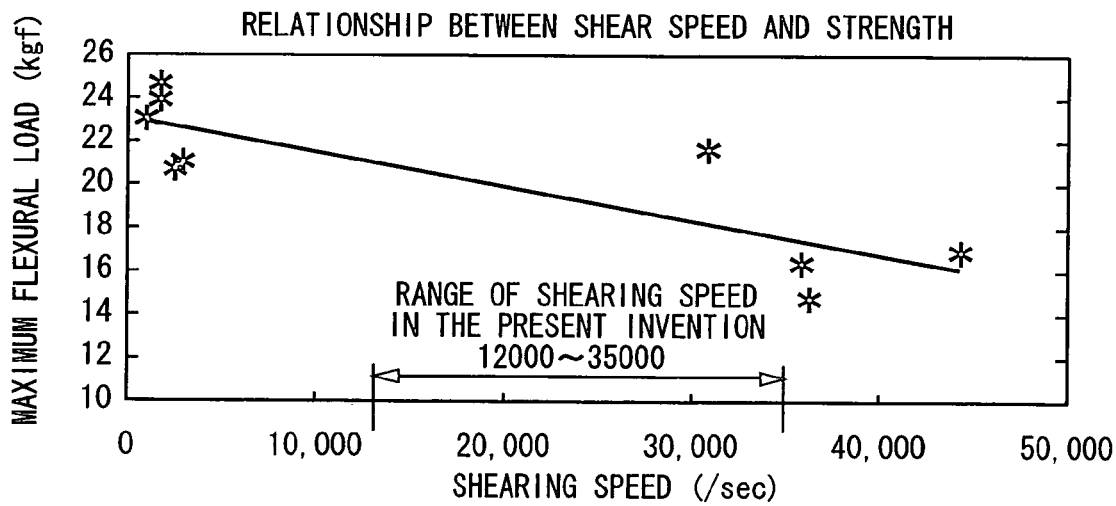
FIG. 6 is a graph showing a relationship between the shearing speed during the manufacture of the expandable granules and the strength of a molded product.

FIG. 6 is a graph showing the relationship between the shearing speed during the manufacture of the expandable granules and the strength of the molded product. As shown in FIG. 6, a tendency could be observed in which the strength of the molded product increased as the shearing speed decreased.

From the results shown in FIG. 3 to FIG. 6, it can be understood that the resin melt viscosity (apparent melt viscosity) and the shearing speed during manufacture of the expandable granules influence the strength of the molded product obtained by expansion-molding these expandable granules. In the present invention, when a melted resin containing a blowing agent that has been mulled in an extruder is extruded from the small holes of a die, by extruding the melted resin such that the shearing speed is 12,000 to 35,000 sec-1 and the apparent melt viscosity of the resin is 100 and 700 poise, the unique effects were obtained that the sizes of the obtained expandable granules were uniform and the expandable granules were easily handled. In addition, the further unique effect was obtained that the strength of the molded product obtained by expansion-molding was not inferior to that of the expandable granules obtained by the suspension polymerization impregnation method. As shown in FIG. 5 and FIG. 6, the ranges of the apparent melt viscosity and the shearing speed in the present invention are set based on the results of thorough investigations in order to balance well the advantageous characteristics such as the sphericity of the obtained expandable granules, and not simply set such that the strength of the molded product becomes high. Thereby, these numerical ranges have a sufficiently critical significance.

INDUSTRIAL APPLICABILITY

Because the method for manufacturing thermoplastic resin expandable granules of the present invention continuously carries out a process from the resin supply to obtaining the expandable granules and uses a manufacturing apparatus having a simple structure, the industrial value is extremely high. In addition, because the granule size of the obtained expandable granules is uniform, the expandable granules are easily handled, and the strength of the molded products obtained by expansion-molding is not inferior to that of expandable granules obtained by suspension polymerization impregnation method, the method can be used extensively in molding, for example, shock-resistant wrapping material for household electrical appliances and precision machinery, transportation containers for food and machine parts, a shock-absorbing parts for vehicle parts, structural parts, display parts, leisure parts and the like. The method thereby has a high industrial value.

What is claimed is:

1. A method for manufacturing spherical thermoplastic resin expandable granules comprising the steps of:
   injecting a blowing agent under pressure into a thermoplastic resin which is melted in an extruder;
   extruding the melted resin containing the blowing agent as an extrudate from a plurality of small holes in a die attached to a distal end of the extruder directly into a coolant liquid, and directly cutting the extrudate by high-speed rotary blades using a hot-cut method; and
   cooling and solidifying the extrudate by contacting with the coolant liquid, and thereby obtaining the expandable granules wherein the melted resin containing the blowing agent passing through land parts of the small holes of the die is extruded such that a shearing speed is 12,000 to 35,000 sec$^{-1}$, and an apparent melt viscosity of the resin is 100 to 700 poise.

2. A method for manufacturing thermoplastic resin expandable granules according to claim 1, wherein the small holes of the die have a diameter of 0.5 to 1.0 mm, and a land length of the small holes is 2 to 4 mm.

3. A method for manufacturing thermoplastic resin expandable granules according claim 1 or 2, wherein the thermoplastic resin is a polystyrene resin, and a temperature thereof at an access into the die is set to a range of 150 to 180° C.

4. A method for manufacturing thermoplastic resin expandable granules according to claim 1 or 2, wherein the thermoplastic resin is a polyethylene resin, and a temperature thereof at an access into the die is set to a range of 130 to 160° C.

5. A method for manufacturing thermoplastic resin expandable granules according to claim 1 or 2, wherein the thermoplastic resin is a polypropylene resin, and a temperature thereof at an access into the die is set to a range of 180 to 210° C.

6. A method for manufacturing thermoplastic resin expandable granules according to claim 1 or 2, wherein:
   a die is used in which: a resin-discharging surface contacting with a stream of the coolant liquid is provided;
   and at the resin-discharging surface, there are no small holes in at least one of a position in an inflow direction and outflow direction of the stream of the coolant liquid and a position orthogonal to the inflow direction and the outflow direction of the stream of the coolant liquid; and
   the method comprises the steps of:
   supplying the thermoplastic resin to the extruder to which the die being attached, and melting and mulling the thermoplastic resin in the extruder;
   moving the thermoplastic resin towards the die while injecting a blowing agent into the thermoplastic resin to form a resin containing a blowing agent; and
   cutting the thermoplastic resin containing the blowing agent discharged from the small holes of the die with a cutter into the stream of the coolant liquid.

7. A method for manufacturing thermoplastic resin expandable granules according to claim 6, wherein the die comprises:
   a resin conduit communicating with a cylinder of the extruder and the small holes formed in the die; and
   a heating medium conduit heating the resin in the resin conduit, and
   wherein the resin in the resin conduit is heated by the heating medium flowing through the heating medium conduit.

8. A method for manufacturing thermoplastic resin expandable granules according to claim 7, wherein an inlet and an outlet of the heating medium conduit are provided in the resin-discharging surface in proximity to a position at which the small holes are not provided.

9. A method for manufacturing thermoplastic resin expandable granules comprising the steps of:
   injecting a blowing agent under pressure into a thermoplastic resin which is melted in an extruder;
   extruding the melted resin containing the blowing agent as an extrudate from a plurality of small holes in a die attached to a distal end of the extruder directly into a coolant liquid, and directly cutting the extrudate by high-speed rotary blades using a hot-cut method; and
   cooling and solidifying the extrudate by contacting with the coolant liquid, and thereby obtaining spherical expandable granules wherein
   the melted resin containing the blowing agent passing through land parts of the small holes of the die is extruded such that a shearing speed is 12,000 to 35,000 sec-1, and an apparent melt viscosity of the resin is 100 to 700 poise.

10. A method for manufacturing spherical thermoplastic resin expandable granules comprising the steps of:
    injecting a blowing agent under pressure into a thermoplastic resin which is melted in an extruder;
    extruding the melted resin containing the blowing agent as an extrudate from a plurality of small holes in a die attached to a distal end of the extruder directly into a coolant liquid, such that a shearing speed is 12,000 to 35,000 sec$^{-1}$, and an apparent melt viscosity of the resin is 100 to 700 poise, and directly cutting the extrudate by high-speed rotary blades using a hot-cut method; and cooling and solidifying the extrudate by contacting with the coolant liquid, and thereby obtaining the expandable granules wherein a resin-discharging surface of the die contacts with a stream of the coolant liquid;

at the resin-discharging surface, the small holes are not provided in at least one of a position along an inflow direction and outflow direction of the stream of the coolant liquid and a position orthogonal to the inflow direction and the outflow direction of the stream of the coolant liquid; and the method further comprises the steps of:

supplying the thermoplastic resin to the extruder to which the die being attached, and melting and mulling the thermoplastic resin in the extruder;

moving the thermoplastic resin towards the die while injecting a blowing agent into the thermoplastic resin to produce a resin containing a blowing agent; and cutting the resin containing the blowing agent discharged from the small holes of the die with a cutter into the stream of the coolant liquid;

wherein, the die comprises:

a resin conduit communicating with a cylinder of the extruder and the small holes formed in the die; and a heating medium conduit heating the resin in the resin conduit, and wherein the resin in the resin conduit is heated by the heating medium flowing through the heating medium conduit and wherein:

a circular sector region P is defined on the resin-discharging surface of the die, the region P having a center radius thereof along a direction of the stream of the coolant liquid, the region P having an central angle within the range of 10° to 50°; and the small holes are not formed in the region P.

11. A method for manufacturing spherical thermoplastic resin expandable granules comprising the steps of:

injecting a blowing agent under pressure into a thermoplastic resin which is melted in an extruder;

extruding the melted resin containing the blowing agent as an extrudate from a plurality of small holes in a die attached to a distal end of the extruder directly into a coolant liquid, such that a shearing speed is 12,000 to 35,000 sec$^{-1}$, and an apparent melt viscosity of the resin is 100 to 700 poise, and directly cutting the extrudate by high-speed rotary blades using a hot-cut method; and cooling and solidifying the extrudate by contacting with the coolant liquid, and thereby obtaining the expandable granules wherein a resin-discharging surface of the die contacts with a stream of the coolant liquid;

at the resin-discharging surface, the small holes are not provided in at least one of a position along an inflow direction and outflow direction of the stream of the coolant liquid and a position orthogonal to the inflow direction and the outflow direction of the stream of the coolant liquid; and the method further comprises the steps of:

supplying the thermoplastic resin to the extruder to which the die being attached, and melting and mulling the thermoplastic resin in the extruder;

moving the thermoplastic resin towards the die while injecting a blowing agent into the thermoplastic resin to produce a resin containing a blowing agent; and cutting the resin containing the blowing agent discharged from the small holes of the die with a cutter into the stream of the coolant liquid;

wherein, the die comprises:

a resin conduit communicating with a cylinder of the extruder and the small holes formed in the die; and a heating medium conduit heating the resin in the resin conduit, and wherein the resin in the resin conduit is heated by the heating medium flowing through the heating medium conduit and wherein:

a circular sector region P is defined on the resin-discharging surface of the die, the region P having a center radius thereof along a direction perpendicular to the stream of the coolant liquid, the region P having an central angle within the range of 10° to 50°; and the small holes are not formed in the region P.

* * * * *

UNITED STATES PATENT AND TRADEMARK OFFICE
CERTIFICATE OF CORRECTION

PATENT NO. : 7,815,828 B2  
APPLICATION NO. : 10/571913  
DATED : October 19, 2010  
INVENTOR(S) : Toshiro Kobayashi et al.

Page 1 of 1

It is certified that error appears in the above-identified patent and that said Letters Patent is hereby corrected as shown below:

Cover Page Item (54) and Col. 1, line 1 Title should read:

-- METHOD FOR MANUFACTURING THERMOPLASTIC RESIN EXPANDABLE GRANULES --.

Signed and Sealed this
Eighth Day of March, 2011

David J. Kappos
*Director of the United States Patent and Trademark Office*